Figure 1:
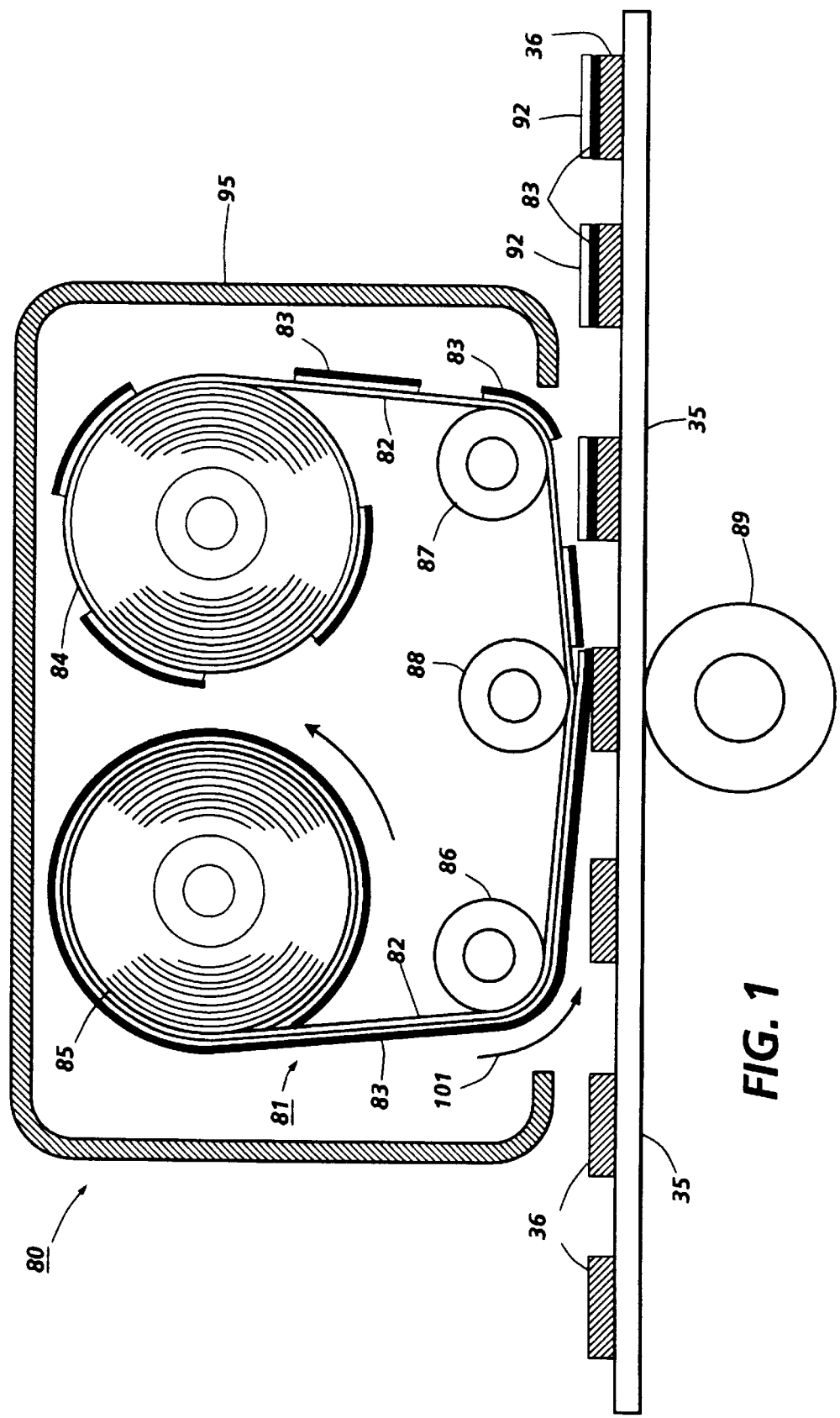

United States Patent [19]
Smith et al.

[11] Patent Number: 5,828,385
[45] Date of Patent: Oct. 27, 1998

[54] MAGNETIC TAPES AND PROCESSES

[75] Inventors: Wayne R. Smith, Pittsford; William A. Sullivan, Rochester, both of N.Y.

[73] Assignee: Xerox Corporation, Stamford, Conn.

[21] Appl. No.: 485,951

[22] Filed: Jun. 7, 1995

Related U.S. Application Data

[62] Division of Ser. No. 7,307, Jan. 21, 1993.

[51] Int. Cl.$^6$ ...................................................... G11B 9/00
[52] U.S. Cl. ............................................................ 346/74.2
[58] Field of Search ..................................... 503/204, 200, 503/214, 226; 400/241.2; 428/195, 321.3; 430/31; 346/74.2, 74.6; 242/335, 234

[56] References Cited

U.S. PATENT DOCUMENTS

| | | | |
|---|---|---|---|
| 4,241,655 | 12/1980 | Dingman | 101/79 |
| 4,727,055 | 2/1988 | Aoyagi et al. | 503/200 |
| 5,366,952 | 11/1994 | Granquist | 503/200 |
| 5,536,445 | 7/1996 | Campbell et al. | 252/308 |

*Primary Examiner*—Benjamin R. Fuller
*Assistant Examiner*—Raquel Yvette Gordon
*Attorney, Agent, or Firm*—William A. Henry, II

[57] ABSTRACT

A tape containing a supporting substrate and a magnetic layer coated thereover. This tape can be selected for thermal fusing processes where the coating, after heating of the tape which is in contact with a nonmagnetic image, transfers into the image and renders it magnetic. The corrected image can then be selected for MICR processes and devices.

4 Claims, 1 Drawing Sheet

5,828,385

MAGNETIC TAPES AND PROCESSES

This is a division of application Ser. No. 08/007,307, filed Jan. 21, 1993.

BACKGROUND OF THE INVENTION

The present invention is generally directed to magnetic applicators and cassettes, and more specifically, the present invention relates to magnetic media applicators, or tapes, reference, for example, U.S. Pat. No. 5,083,157, the disclosure of which is totally incorporated herein by reference. The applicators of the present invention can be utilized in a number of imaging and printing systems, including electrostatic, and magnetic character recognition processes (MICR), reference, for example, U.S. Pat. No. 4,517,268 and Reissue U.S. Pat. No. 33,172, the disclosures of which are totally incorporated herein by reference. In embodiments, the economical tapes of the present invention are comprised of a supporting substrate and a continuous coating or film thereover containing a magnetite component therein, or thereon, and wherein such tapes can be utilized in thermal transfer processes. Advantages of the tapes of the present invention include the conversion of nonmagnetic images or characters to magnetic images, that is, MICR images or characters. For example, checks with nonmagnetic characters or images thereon can be converted to checks with magnetic characters or images thereon by contacting such nonmagnetic checks with the tapes of the present invention and using heat to transfer the tape coating component of the tape to the checks, a thermal transfer process in embodiments.

The tapes of the present invention in embodiments can be selected as a source of magnetite when, for example, the tape is contacted with a developed image followed by heating. Subsequently the image, or images obtained can be utilized in known MICR apparatuses and processes. In embodiments, the present invention is related to tapes with magnetites therein and wherein these tapes can be utilized to convert a number of different images, such as electrostatic developed images into magnetic images useful in MICR processes for generating documents which are magnetically recognizable. More specifically, the tapes of the present invention can be selected to convert nonmagnetic images or characters on documents such as personal checks and other security documents to magnetic images or magnetic characters, which documents can be subsequently processed in reader/sorters which are sensitive to magnetic properties of the printed images. In embodiments of the present invention, there are provided tapes that can be selected for generating documents, such as checks, including for example dividend checks, turn around documents such as invoice statements like those submitted to customers by American Express and VISA, corporate checks, highway tickets, rebate checks, and other documents with magnetic codes thereon. In embodiments, image smearing and offsetting of the toner to read and write heads, including offsetting to the protective foil that may be present on the aforesaid heads in magnetic ink character recognition processes and apparatus inclusive of, for example, the read and write heads present in MICR (magnetic ink character recognition) reader/sorters such as the commercially available IBM 3890™, NCR 6780™, reader/sorters from Burroughs Corporation, and the like, it is believed can be substantially avoided or minimized when utilizing the tapes of the present invention. Some of the reader/sorter printers contain protective foils thereon, reference for example the IBM 3890™, and the problems associated with such protective foils, as illustrated herein with respect to read and write heads with no foils, are believed to be substantially alleviated with the processes of the present invention.

The documents, including the personal checks mentioned herein, can be obtained, for example, by generating a latent image thereon and subsequently developing the image with a non-magnetic toner and contacting the developed image with the tape of the present invention followed by heating, fusing, cooling and stripping, to enable the tape coating layer containing magnetite, such as acicular magnetites to be deposited and/or attracted to the developed image, and thereafter further processing the MICR images, reference U.S. Pat. No. 4,517,268 and Reissue U.S. Pat. No. 33,172, the disclosures of which are totally incorporated herein by reference. The final developed MICR image can contain thereon, for example, the characters zero, 1, 2, 3, 4, 5, 6, 7, 8, and 9, and up to four symbols (E-13B and CMC-7 font), which characters are magnetically readable by the IBM 3890™, or other similar apparatus.

The following United States patents are mentioned: U.S. Pat. Nos. 4,108,786; 4,256,818; 4,265,993; 4,543,312; 4,564,573; 4,600,676 and 4,777,104, which disclose colored toners and the use of, for example, cobalt as the magnetic ingredients, see for example column 3, beginning at line 44, of the '786 patent and note particularly column 3, at around line 53, wherein cobalt powder is disclosed as an inorganic magnetic material for the toner of the '786 patent, and also note that colored pigments such as yellow, orange, red, violet, blue, green, white and the like can be selected, see columns 4 and 5 of the aforementioned '786 patent; U.S. Pat. No. 4,517,268 mentioned herein; and U.S. Pat. Nos. 3,905,841; 4,284,700; 4,436,803; 4,623,602 and 5,083,157 relating to MICR processes wherein a magnetic image is provided over a non-magnetic toned image. The disclosures of each of the aforementioned patents are totally incorporated herein by reference.

In a patentability search report in a copending application U.S. Ser. No. 609,333 (D/90192), the disclosure of which is totally incorporated herein by reference, the following United States patents were listed: U.S. Pat. No. 4,514,484 directed to a powder suitable for developing latent images comprised of magnetic particles coated with a mixture of a thermoplastic resin and a silane, see for example the Abstract of the Disclosure; note column 3, beginning at line 15, wherein it is indicated that into the organic thermoplastic resin is incorporated a silane selected from those illustrated; U.S. Pat. No. 4,517,268 relating to xerographic toners for MICR printing; U.S. Pat. No. 4,268,598 which discloses a magnetic toner for the printing of machine readable legends; U.S. Pat. No. 4,748,506 relating to magnetic encapsulated toners, see column 4, wherein there is mentioned, for example, Columbia Mapico Black and Bayferrox magnetites; and U.S. Pat. Nos. 3,627,682; 4,439,510; 4,536,462 and 4,581,312, which patents disclose, for example, encapsulated toners with magnetites. The disclosures of each of the aforementioned patents are totally incorporated herein by reference.

In copending application U.S. Ser. No. 445,221 (D/89086), the disclosure of which is totally incorporated herein by reference, there are illustrated magnetic image character recognition processes with encapsulated toners wherein there is selected as the magnetite a black magnetite such as MAPICO BLACK™. More specifically, there is illustrated in this copending application an ionographic process which comprises the generation of a latent image comprised of characters; developing the image with an encapsulated magnetic toner comprised of a core comprised of a polymer and magnetite with a coercivity of from about 80 to about 250 Oersteds, and a remanence of from about 20 to about 70 Gauss, and wherein the core is encapsulated within a polymeric shell; and subsequently providing the developed image with magnetic ink characters thereon to a reader/sorter device whereby toner offsetting and image smearing is minimized in said device. These and other magnetites of the copending application can be selected for the coated tapes of the present invention There is a need for magnetic image character recognition (MICR) processes enabling the generation of documents, such as personal checks, wherein toner offsetting and image smearing is avoided, and the magnetic strength signal in an embodiment are from a desirable detection range of about 75 to about 150 percent on the ON-US character. There is also a need for the generation of developed images including the generation of personal checks in laser printers or ionographic printers utilizing magnetic ink character recognition technology, wherein image offset to protective foils present on the read and write heads may be avoided or minimized, and image smearing may be avoided or minimized. More specifically, there is a need for tapes that when contacted with latent developed images eliminate or minimize image ghosting. There is a need for tapes for generating high quality MICR images from non-MICR images and/or characters, and whose magnetic integrity can be maintained after many passes in MICR reading and sorting processes.

SUMMARY OF THE INVENTION

It is therefore an object of the present invention to provide magnetic applicators, or tapes, with many of the advantages illustrated herein.

In another object of the present invention there are provided imaging processes wherein there is initially formed normal nonmagnetic developed toner images and subsequently these images are contacted with the tape and heated, whereby the magnetite containing layer is transported or adheres to to the developed image thus in effect converting such images to magnetic images or MICR images and enabling their use in MICR apparatuses and processes, such as those mentioned herein, including the Xerox Corporation 9700 printer.

Another object of the present invention is the provision of tapes with certain semicontinuous or preferably continuous coatings thereover, which coatings contain magnetites in effective amounts.

A further object of the present invention relates to the provision of magnetic image character recognition processes, especially processes for generating checks, and the like with magnetic characters thereon.

Moreover, another object of the present invention is the provision of MICR processes wherein image offsetting is eliminated in some embodiments, or minimized in other embodiments it is believed.

An additional object of the present invention is related to tapes which are insensitive to changes in humidity it is believed.

These and other objects of the present invention can be accomplished in embodiments by providing magnetic applicators, such as tapes that can be selected to prepare magnetic images suitable for MICR methods and apparatuses. Thus, in embodiments the tapes of the present invention can be contacted with a developed image followed by heating and fusing for the primary purpose of introducing the coated magnetite layer of the tape into the developed image, followed by utilizing such image for MICR processes. More specifically, the tapes, which may be considered similar to typewriter ribbons, of the present invention in embodiments are contacted with a document like a check with nonmagnetic characters thereon, such as generated for example, in a Xerox Corporation 4135, and the document is then contacted with a tape of the present invention, that is, the tape and document are brought together and are in contact with each other; followed by heating, which heat in embodiments can be applied to the tape side, and which heating is sufficient to, for example, cause some melting of portions of the non-magnetic toner; followed by cooling and stripping the tape therefrom and wherein there remains on the document the magnetite coating previously contained on the tape. The aforementioned heating can be accomplished at various effective temperatures of for example from about 300 to 400 degrees F. The tapes of the present invention are comprised of a supporting substrate, and coated thereover, or contained thereon, in various effective thicknesses, a composition comprised of magnetite. Typical thickness of the final tape are from about 1 to about 10, preferably from about 1 to about 3 microns, and more preferably about 2 microns. Other effective thicknesses outside these ranges may be selected in embodiments.

FIG. 1 shows a side view of a magnetizing device using the tape and cassette of the present invention in the process of magnetic overcoating onto nonmagnetic toner.

In embodiments, the present invention is directed to a tape comprised of a supporting substrate and a coating thereover comprised of magnetite; a tape comprised of a supporting substrate and thereover a coating comprised of a resin binder, magnetite, pigment, plasticizer, polymer, and a halogenated rubber; a tape for MICR processes which comprises a heat resistant polymer film backing with a layer of magnetite attached thereto; a MICR process which comprises the generation of a latent image on an imaging member, developing the image with a developer composition comprised of toner and carrier particles, contacting the tape with said developed image followed by heating, fusing and cooling; a device used in creating images readable by a MICR reader-sorter, comprising: a cassette including pay-out and take-up spools; and a substrate wound up onto said pay-out spool and connected to said take-up spool of said cassette, said substrate having a heat releasable magnetic material or coating attached thereto; and a cassette adapted to be used to create MICR readable images out of previously fused non-MICR images, said cassette including pay-out and take-up spools and a substrate wound up onto said pay-out spool and connected to said take-up spool of said cassette, said substrate having a heat releasable magnetic material attached thereto.

Examples of supporting substrates, in effective thickness of, for example, preferably from about 0.33 to about 0.5 mils (from amounts included within the range throughout) include any substance that will support the coating and render it operative as indicated herein. Examples of substrates include polyesters, styrenes, styrene acrylates, styrene methacrylates, polyimides, polyamides, crosslinked styrene polymers, epoxies, polyurethanes, polypropylenes, vinyl resins, including homopolymers or copolymers of two or more vinyl monomers; and polymeric esterification products of a dicarboxylic acid and a diol comprising a diphenol. Vinyl monomers include styrene, p-chlorostyrene, unsaturated mono-olefins such as ethylene, propylene, butylene, isobutylene and the like; saturated mono-olefins such as vinyl acetate, vinyl propionate, and vinyl butyrate; vinyl esters like esters of monocarboxylic acids including methyl acrylate, ethyl acrylate, n-butylacrylate, isobutyl acrylate, dodecyl acrylate, n-octyl acrylate, phenyl acrylate, methyl methacrylate, ethyl methacrylate, and butyl methacrylate; acrylonitrile, methacrylonitrile, acrylamide; mixtures thereof; and the like, styrene butadiene copolymers with a styrene content of form about 70 to about 95 weight percent. A preferred coating is styrene in embodiments.

As one polyester there can be selected it is believed the esterification products of a dicarboxylic acid and a diol comprising a diphenol. These polyesters are illustrated in U.S. Pat. No. 3,590,000, the disclosure of which is totally incorporated herein by reference. Other specific polyesters that can be selected it is believed are obtained from the reaction of bisphenol A and propylene oxide; followed by the reaction of the resulting product with fumaric acid, and branched polyester resins resulting from the reaction of dimethylterephthalate, 1,3-butanediol, 1,2-propanediol, and pentaerythritol. One preferred polyester substrate is comprised of MYLAR.

The tape coating includes magnetites, colorants, or pigments like carbon black, such as a Vulcan carbon black which is believed to be conductive and is available from Cabot Corporation, other suitable carbon blacks available from Columbian Chemical, a polymer, like styrene, a rubber, like chlorinated rubber, Mirasol, and plastolein believed to be a plasticizer. In embodiments, the coating for the tape is comprised of a magnetite, such as a mixture of iron oxides, Mirasol which may function as a binder additive although it is not designed to be limited to this, styrene polymer binder, plasticizer and a halogenated and preferably chlorinated rubber, which coating can be prepared by mixing the components and thereafter applying as a continuous coating to the supporting substrate from a solvent solution thereof wherein the solvent can be for example an organic solvent like methylethyl ketone (MEK).

Examples of magnetites, which magnetites are generally considered a mixture of iron oxides include those commercially available as Mapico Black; other magnetites like MO4232, MAT 5212 and the like present in effective amounts of, for example, from about 35 to about 80 percent by weight, and preferably from about 50 to about 60 percent by weight. Preferred are acicular, or needle like shaped magnetites like MO4232.

Examples of plasticizers, present in various effective amounts, such as for example, from about 3 to about 10 weight percent include benzoic acid derivatives, like diethylene glycol dibenzoate, dipropylene glycol dibenzoate, polyethylene glycol 200 benzoate; citric acid derivatives like acetyl tri-n-butyl citrate, acetyl triethyl citrate, tri-n-butyl citrate; isophthalic derivatives like di-2-ethylhexyl isophthalate; oleic acid derivatives, like butyl oleate, n-propyl oleate, tetrahydroturfuryl oleate, and the like. Other known effective plasticizers may be selected it is believed.

Examples of rubbers, present in various minor effective amounts such as from about 1 to about 3 and preferably from about 1 to about 1.5 weight percent include chlorinated rubbers, chlorinated polybutadienes, halogenated, especially chlorinated polyolefins, and the like.

Mirasol, present in various effective amounts such as from about 1 to about 3 and preferably from about less than 1 to about 1.5 weight, is available from C. J. Osborn, a division of Suvarcar Corporation, of New Jersey. Mirasol is believed to be a resin; such as an alkyd, an epoxy, a polyester a urethane, or mixtures thereof. A mirasil may also be selected and it is believed that such mirasil is similar in composition to mirasol.

There may be included between the supporting substrate and the coating layer an adhesive layer, such as a known glue, or similar material to assist in allowing for more adhesion of the coating layer; or preferably a release layer, like a wax such as polyporpylene and the like, which wax assists in release of the coating from the supporting substrate.

The tapes of the present invention can be prepared by a number of known means, such as for example, by forming a dispersion of the coating components in a solvent or solvent mixture like methylethylketone and toluene (1:1); milling in, for example, a barrel for a sufficient time to obtain a suitable dispersion; and thereafter coating the dispersion on to a supporting substrate by, for example, draw bar coating methods or other known slurry coating methods; and drying by, for example, in an air heated oven to remove the solvent. The resulting tapes can be rolled up on a spool or sliced into smaller tapes, like about 1 centimeter wide.

In embodiments, examples of specific continuous coatings include about 59.1 percent by weight of magnetite, like MO4232, 24 percent of styrene polymer, 6 percent of carbon black, 8 percent of plasticizer, 1.5 percent of chlorinated rubber, and 1.4 percent of Mirasol.

Examples of specific tape coating components are illustrated in the following Table wherein the Mirasol is obtained from C. J. Osborn.

| Tape # | Chl Rubber | Iron oxide | Carbon black | Styrene | Mirasol | Plasticizer |
| --- | --- | --- | --- | --- | --- | --- |
| 60034 | 7.3 | 58.8 | 6.4 | 25.2 | 2.0 | 0.3 |
| 60014 | 1.48 | 53.9 | 5.91 | 33.03 | 5.39 | 0.29 |
| 60015 | 1.68 | 61.11 | 6.7 | 28.58 | 1.59 | 0.34 |
| 60016 | 1.57 | 57.29 | 6.28 | 26.78 | 1.49 | 6.59 |
| 60017 | 1.51 | 55.05 | 6.04 | 25.75 | 1.43 | 10.22 |
| 60018 | 1.48 | 53.89 | 5.91 | 25.2 | 1.4 | 12.12 |
| 60019 | 1.47 | 53.72 | 5.89 | 31.33 | 1.4 | 6.19 |
| 60020 | 1.39 | 50.59 | 5.55 | 35.33 | 1.31 | 5.83 |
| 60021 | 1.5 | 59.1 | 6 | 24 | 1.4 | 8 |

Initially there is formed an image, such as an electrostatic latent image, followed by development with a toner, especially a more magnetic toner, reference for example the toners mentioned herein, and the U.S. patents recited, and subsequently the developed image is contacted with the tape of the present invention and thermal transfer of the coating from the tape is accomplished. More specifically the tape, or donor roll of the present invention is brought into contact with a nonmagnetic image, such as that contained on documents such as checks, followed by heating and cooling, and thereafter stripping the substrate, whereby there results a magnetic image (MICR), that is, the nonmagnetic image is converted to a magnetic image, and the document with the magnetic image can then be utilized in MICR processes and devices such as those illustrated herein. Thus nonmagnetic images can be transformed into magnetic images or MICR images by, for example, thermal transfer processes by utilizing the tapes of the present invention.

Examples of toner compositions selected for the development of the initial image prior to conversion to the MICR image include known nonmagnetic toners, such as those illustrated in U.S. Pat. No. 4,338,390, the disclosure of which is totally incorporated herein by reference, describing developer compositions containing as charge enhancing additives organic sulfate and sulfonates, which additives can impart a positive charge to the toner composition; U.S. Pat. No. 4,298,672, the disclosure of which is totally incorporated herein by reference, disclosing positively charged toner compositions with resin particles and pigment particles, and as charge enhancing additives alkyl pyridinium compounds; toner compositions with distearyldimethylammonium methyl sulfate; toner compositions comprised of styrene resin and pigments such as carbon black, like Regal 330 carbon black, and the like. Additionally, other documents disclosing toner compositions include U.S. Pat. Nos. 3,944,493; 4,007,293; 4,079,014; 4,394,430, and 4,560,635 which illustrates a toner with a disteary dimethyl ammonium methyl sulfate charge additive, U.S. Pat. No. 4,752,550, directed to toners and developers with inner salt charge additives and mixtures of such salts with other charge additives, see for example column 4; the disclosure of each of these patents being totally incorporated herein by reference. Generally, the nonmagnetic toner is comprised of a known toner resin and a known pigment-like carbon black.

In embodiments of the present invention there is provided a magnetic image character recognition (MICR) process utilizing the tapes of the present invention. More specifically, in one embodiment there is provided an MICR process which comprises the generation of a latent image comprised of characters, followed by developing the image with a nonmagnetic toner composition, that is, one free of a magnetic component like a magnetite; subsequently contacting the developed image with the tape of the present invention; heating, cooling, and removing the unused portion of the tape; thereafter providing the developed image with magnetic ink characters thereon to a reader/sorter device. The magnetic image character recognition process is known, as mentioned herein, particularly in the U.S. patents and reissue patent disclosed herein and these processes can be selected for the invention of the present application.

In FIG. 1, magnetic media applicator 80 is positioned to apply a magnetic media to selected parts of sheets 35. When these sheets contain, for example, checks with four (4) on each sheet, the numbers or code along the bottom of any sheet are overcoated with a magnetic media as shown in FIG. 1 which makes the codes machine readable. The checks can now be passed through a machine called a reader-sorter by the bank processing any of the checks with the number and symbols now being recognizable.

Magnetic media applicator 80 comprises a conventional fuser 88 mounted against the back of thin tape 81. Tape 81 comprises a heat resistant polyester film backing member 82, such as, Mylar with a layer of magnetite 83 adhered thereto and is positioned to contact sheets deflected in its direction by gate 56. Tape 81 is contained within a cassette 95 and wound up onto a pay-out spool 85 and connected to a take-up spool 84 at one end thereof after passing tensioning rollers 86 and 87, respectfully, with fuser 88 being positioned between the two spools 84 and 85 facing the backing member 82 and opposite a backup roller 89. Sheets 35 with the codes and symbols desired to be magnetized are located directly below fuser 88 which heats and presses film 81 against previously fused non-magnetic toner 36. The heat causes the magnetite that is directly over standard toner characters to release from the backing member and adhere to the previously fused characters while the copy sheet continues en route toward an output tray of the machine in which it is mounted.

It should be understood that multiple lines of coded material could be magnetized with the present magnetizing process by including multiple cassettes of tape positioned as desired. Further, while magnetic media applicator is disclosed herein as an on-line device, i.e., one that is connected to and accepts sheets from a copier/printer as they leave the copier/printer, one can readily see that the magnetic media applicator is adaptable to off-line use as well. In short, magnetic media applicator 80 is adaptable for both on-line and off line applications and provides magnetic ink character readable images on demand.

Other modifications of the present invention may occur to those skilled in the art based upon a reading of the present disclosure and these modifications are intended to be included within the scope of the present invention.

What is claimed is:

1. A device used in creating images readable by a MICR reader-sorter, comprising:

a cassette including pay-out and take-up spools; and a substrate wound up onto said pay-out spool and connected to said take-up spool of said cassette, said substrate having a heat releasable magnetic coating attached thereto.

2. A cassette adapted to be used to create MICR readable images out of previously fused non-MICR images, said cassette including pay-out and take-up spools and a substrate wound up onto said pay-out spool and connected to said take-up spool of said cassette, said substrate having a heat releasable magnetic material attached thereto.

3. A device in accordance with claim 1 wherein the heat release magnetic material is comprised of a resin binder, magnetite, pigment, plasticizer, polymer, and a halogenated rubber.

4. A cassette in accordance with claim 2 wherein the heat release magnetic material is comprised of a resin binder, magnetite, pigment, plasticizer, polymer, a halogenated rubber, and Mirasol.

* * * * *